(12) United States Patent
Sun

(10) Patent No.: US 10,805,680 B2
(45) Date of Patent: Oct. 13, 2020

(54) METHOD AND DEVICE FOR CONFIGURING IMAGE MODE

(71) Applicant: SHENZHEN SKYWORTH-RGB ELECTRONICS CO., LTD., Guangdong (CN)

(72) Inventor: Lei Sun, Guangdong (CN)

(73) Assignee: SHENZHEN SKYWORTH-RGB ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 16/313,942

(22) PCT Filed: Nov. 1, 2016

(86) PCT No.: PCT/CN2016/104208
§ 371 (c)(1),
(2) Date: Dec. 28, 2018

(87) PCT Pub. No.: WO2018/000676
PCT Pub. Date: Jan. 4, 2018

(65) Prior Publication Data
US 2019/0230412 A1 Jul. 25, 2019

(30) Foreign Application Priority Data
Jul. 1, 2016 (CN) .......................... 2016 1 0511601

(51) Int. Cl.
*H04N 21/442* (2011.01)
*H04N 21/45* (2011.01)
*H04N 21/485* (2011.01)

(52) U.S. Cl.
CPC ..... *H04N 21/44222* (2013.01); *H04N 21/442* (2013.01); *H04N 21/45* (2013.01); *H04N 21/4532* (2013.01); *H04N 21/485* (2013.01)

(58) Field of Classification Search
CPC .......... H04N 21/44222; H04N 21/442; H04N 21/45; H04N 21/4532; H04N 21/485
See application file for complete search history.

(56) References Cited

U.S. PATENT DOCUMENTS 6,285,344 B1 9/2001 Everard et al.
2006/0282850 A1* 12/2006 Kim .................... H04N 21/4318
725/38

(Continued)

FOREIGN PATENT DOCUMENTS

CN 104378688 A 2/2015
CN 104820537 A 8/2015

(Continued)

OTHER PUBLICATIONS

Jack, Keith. "Color Spaces." Video Demystified : A Handbook for the Digital Engineer, Elsevier Science & Technology, 2007. pp. 15-36 ProQuest Ebook Central, http://ebookcentral.proquest.com/lib/uspto-ebooks/detail.action?docID=405645. Accessed Feb. 10, 2020 (Year: 2007).*

(Continued)

*Primary Examiner* — Randy A Flynn
(74) *Attorney, Agent, or Firm* — Duane Morris LLP

(57) ABSTRACT

Disclosed are a method and device for configuring an image mode. The method includes: determining a current data transmission channel, obtaining matching a data parameter in a database corresponding to the data transmission channel, where the data parameter include one or more of: a resolution ratio, a brightness and a color saturation, and configuring an image mode for playing the current data according to the data parameter and a preset algorithm.

12 Claims, 3 Drawing Sheets

(56) References Cited

U.S. PATENT DOCUMENTS

| | | | | |
|---|---|---|---|---|
| 2008/0043031 A1* | 2/2008 | Jagmag | ............ | H04N 21/42202 |
| | | | | 345/581 |
| 2010/0027973 A1* | 2/2010 | Cheng | .................. | H04N 7/0125 |
| | | | | 386/356 |
| 2010/0157154 A1* | 6/2010 | Kobayashi | ............... | H04N 9/67 |
| | | | | 348/557 |
| 2010/0220244 A1* | 9/2010 | Lee | .................... | H04N 21/4122 |
| | | | | 348/739 |
| 2011/0205259 A1* | 8/2011 | Hagood, IV | ......... | G09G 3/2003 |
| | | | | 345/690 |
| 2012/0206653 A1* | 8/2012 | Graves | ............ | H04N 21/47205 |
| | | | | 348/571 |
| 2014/0056577 A1* | 2/2014 | Ogawa | .................... | H04N 5/85 |
| | | | | 386/329 |

FOREIGN PATENT DOCUMENTS

| | | |
|---|---|---|
| CN | 105225646 A | 1/2016 |
| CN | 105979370 A | 9/2016 |

OTHER PUBLICATIONS

International Search Report issued in connection with International patent application No. PCT/CN2016/104208, dated Mar. 23, 2017, 4 pages.

\* cited by examiner

METHOD AND DEVICE FOR CONFIGURING IMAGE MODE

CROSS REFERENCE TO RELATED APPLICATIONS

This is a National Stage Application, filed under 35 U.S.C. 371, of International Patent Application No. PCT/CN2016/104208, filed on Nov. 1, 2016, which claims priority to Chinese patent application No. 201610511601.8 filed on Jul. 1, 2016, contents of both of which are incorporated herein by reference in their entireties.

TECHNICAL FIELD

The present application relates to the technical field of television, for example, to a method and device for configuring an image mode.

BACKGROUND

With the continuous progress and development of television technology, the demand of users for the audio-video effect of televisions is also getting higher and higher, and more and more devices display images using televisions, such as Xbox gaming devices, high-definition set-top boxes and video players, etc.

At present, television images, in a system default state, are all in a standard mode. Users watch televisions, play games or watch movies mostly in the standard mode. Different image modes have different picture processing modes, for example, the standard mode is merely suitable for watching daily television programs and online videos while soft mode or cinema mode tends to have a softer color and picture, and some special processing needs to be performed on 24P movies for a better viewing effect. Additionally, the image effect adjusting for games will turn off image post-processing to reduce output delay, and add Motion Estimate and Motion Compensation (MEMC) to further meet the demands of players.

SUMMARY

The present application provides a method and device for configuring an image mode, which can select an image play mode matching the played image contents.

In a first aspect, embodiment of the present application provides a method for configuring the image mode. The method includes:

determining a current data transmission channel;

obtaining a matching data parameter in a database corresponding to the data transmission channel, where the data parameter includes one or more of: a resolution ratio, a brightness and a color saturation; and configuring, according to the data parameter and a preset algorithm, an image mode for playing current data.

Optionally, the data transmission channel is at least one of: a High Definition Multimedia Interface (HDMI)/Mobile High-Definition Link (MHL) channel, a digital television channel, a local channel, an online video channel, an analog television channel, a video channel, a computer channel and a component channel.

Optionally, the configuring an image mode for playing current data according to the data parameter and a preset algorithm includes:

determining, according to the resolution ratio, whether the current data is a standard-definition signal or a high-definition signal;

in response to determining that the current data is the standard-definition signal, configuring the image mode for playing the current data to be a color encoding ITU-R BT.601 format; and in response to determining that the current data is the high-definition signal, configuring the image mode for playing the current data to be a color encoding ITU-R BT.709 format.

Optionally, a relationship between the brightness of the standard-definition signal and RGB data and a relationship between color of the standard-definition signal and the RGB data are: Y601=0.299R'+0.587G'+0.114B, Cb=−0.172R'−0.339G'+0.511B'+128 and Cr=0.511R'−0.428G'−0.083B'+128; and a relationship between the brightness of the high-definition signal and the RGB data and a relationship between color of the high-definition signal and the RGB data are: Y709=0.213R'+0.715G'+0.072B', Cb=−0.117R'−0.394G'+0.511B'+128 and Cr=0.511R'−0.464G'−0.047B'+128.

Optionally, the configuring an image mode for playing current data according to the data parameter and a preset algorithm includes that:

inputting an image content of the current data to a high-pass filter, a band-pass filter and a low-pass filter respectively;

determining a gain factor according to a mapping relationship between a mean brightness and a preset brightness threshold in the data parameter;

acquiring compensation data High Pass_Counter according to the gain factor and a pixel number cumulatively outputted by the high-pass filter;

determining a proportion according to the compensation data High Pass_Counter, a pixel number BandPass_Counter cumulatively outputted by the band-pass filter and a pixel number LowPass_Counter cumulatively outputted by the low-pass filter;

determining, according to a relationship between the proportion and a preset proportion threshold, whether the image content of the current data is a high bandwidth or a low bandwidth;

in response to determining that the image content of the current data is a high bandwidth, configuring the image mode for playing the current data to be a high bandwidth image mode; and in response to determining that the image content of the current data is a low bandwidth, configuring the image mode for playing the current data to be a low bandwidth image mode.

In a second aspect, the embodiment of the present application further provides a device for configuring an image mode. The device includes:

a determination module, which is configured to determine a current data transmission channel;

a matching module, which is configured to obtain a matching data parameter in a database corresponding to the data transmission channel, wherein the data parameter comprises one or more of: a resolution ratio, a brightness and a color saturation; and a configuration module, which is configured to configure, according to the data parameter and a preset algorithm, an image mode for playing current data.

Optionally, the data transmission channel is a HDMI/MHL channel, or a digital television channel, or a local channel, or an online video channel, or an analog television, or a video channel, or a computer channel or a component channel.

Optionally, the configuration module is configured to:

determine, according to the resolution ratio, whether the current data is a standard-definition signal or a high-definition signal;

in response to determining that the current data is the standard-definition signal, configure the image mode for playing the current data to be a color encoding ITU-R BT.601 format; and in response to determining that the current data is the high-definition signal, configure the image mode for playing the current data to be a color encoding ITU-R BT.709 format.

Optionally, a relationship between the brightness of the standard-definition signal and RGB data and a relationship between color of the standard-definition signal and the RGB data are: Y601=0.299R'+0.587G'+0.114B', Cb=−0.172R'−0.339G'+0.511B'+128 and Cr=0.511R'−0.428G'−0.083B'+128; and a relationship between the brightness of the high-definition signal and the RGB data and a relationship between color of the high-definition signal and the RGB data are: Y709=0.213R'+0.715G'+0.072B', Cb=−0.117R'−0.394G'+0.511B'+128 and Cr=0.511R'−0.464G'−0.047B'+128.

Optionally, the configuration module is configured to:

input an image content of the current data to a high-pass filter, a band-pass filter and a low-pass filter respectively;

determine gain factor according to a mapping relationship between a mean brightness and a preset brightness threshold in the data parameter;

acquire a compensation data High Pass_Counter according to the gain factor and a pixel number cumulatively outputted by the high-pass filter;

determine a proportion according to the compensation data High Pass_Counter, a pixel number BandPass_Counter cumulatively outputted by the band-pass filter and a pixel number LowPass_Counter cumulatively outputted by the low-pass filter;

determine, according to a relationship between the proportion and a preset proportion threshold, whether the image content of the current data is a high bandwidth or a low bandwidth;

in response to determining that the image content of the current data is the high bandwidth, configure the image mode for playing the current data to be a high bandwidth image mode; and in response to determining that the image content of the current data is the low bandwidth, configure the image mode for playing the current data to be a low bandwidth image mode.

In a third aspect, the embodiment of the present application further provides an electronic device, including:

at least one processor; and a memory which is communicatively connected to the at least one processor.

The memory stores instructions executable by the at least one processor, execution of the instructions by the at least one processor causes the at least one processor to execute the method for configuring an image mode in any one of embodiments of the present application when executing instructions.

In a fourth aspect, the embodiment of the present application further provides a non-transient computer-readable storage medium. The non-transient computer-readable storage medium stores computer-executable instructions to enable the computer to execute the method for configuring an image mode in any one of embodiments of the present application.

The embodiments of the present application provide a method and device for configuring the image mode. The current data transmission channel is determined. Matching data parameters in a database corresponding to the data transmission channel are obtained. The data parameters include one or more of: a resolution ratio, a brightness and a color saturation. And the image mode for playing current data is configured according to the data parameters and a preset algorithm. The system firstly determines the device type by detecting and recognizing the signal input device. The output content of the device is determined according to the device type. Parameters matching the output content of the device are automatically looked up in the database, and an image display algorithm is adjusted to one matching the current image content, so that users can experience a more suitable image effect without adjusting.

BRIEF DESCRIPTION OF DRAWINGS

One or more embodiments are illustrated by way of example, and not by limitation, in the figures of the accompanying drawings. Elements have the same reference numeral designations represent like elements throughout. The drawings are not to scale, unless otherwise disclosed.

DETAILED DESCRIPTION

The embodiments of the present application will be described below with reference to the accompanying drawings. It is to be understood that the embodiments set forth below are intended to illustrate and not to limit the present application. Additionally, it is to be noted that to facilitate description, only part, not all, of structures related to the embodiments of present application are illustrated in the accompanying drawings. If not in collision, features in the embodiments may be combined with each other.

Figure 1:
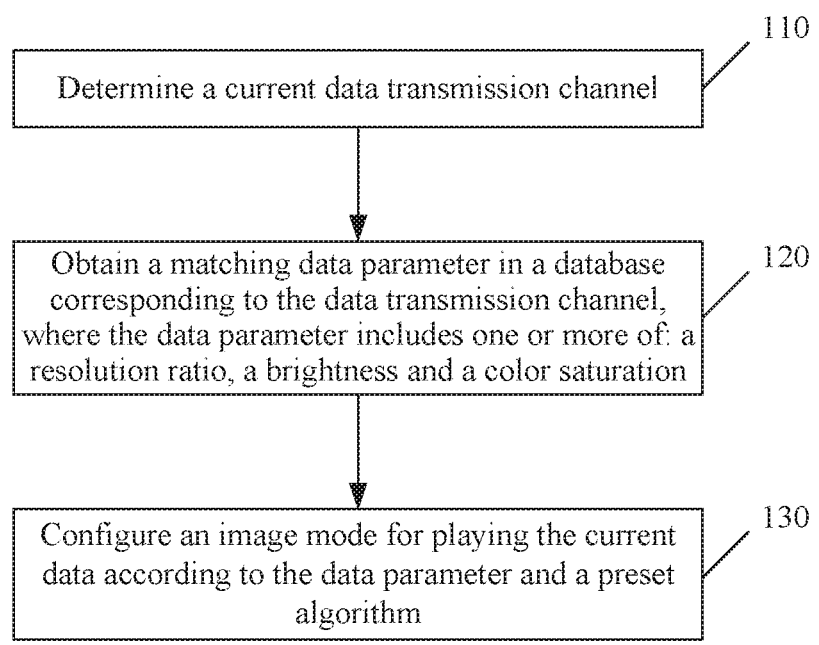
FIG. 1 is a flowchart of a method for configuring an image mode according to an embodiment of the present application.

Referring to FIG. 1, FIG. 1 is a flowchart of a method for configuring an image mode according to an embodiment.

As shown in FIG. 1, the method for configuring the image mode includes:

In S110, a current data transmission channel is determined.

After a television is booted, the system automatically detects a channel. Each solution has a different detection method. Since High Definition Multimedia Interface (HDMI) is more popular, this embodiment is described by using the HDMI as an example, and similar methods may be used for other channels. After the system determines that the current channel is HDMI, relevant information of a signal output device is determined by reading Auxiliary Video information InfoFrame (AVI InfoFrame) of the HDMI. An HDMI signal source notifies, through the AVI InfoFrame, a HDMI receiving device of various properties of the image to be sent, such as an encoding mode (such as YCbCr/VGA), a scanning mode (Overscan/Underscan), an aspect ratio (16:9/4:3) and a pixel repetition rate, etc. Formats in HDMI are developed based on the television, and directly refer to a DTV Profile for uncompressed High Speed Digital Interfaces standard of EIA/CEA-861-B, EIA/CEA-861-B has formulated 34 formats. If some small changes are taken into consideration, such as an image repetition, there are more than 348 formats.

Optionally, the data transmission channel is a High Definition Multimedia Interface (HDMI)/Mobile High-Definition Link (MHL) channel, or a digital television channel, or a local channel, or an online video channel, or an analog television, or a video channel, or a computer channel or a component channel.

In S120, a matching data parameter id obtained in a database corresponding to the data transmission channel. The data parameter includes one or more of: a resolution ratio, a brightness and a color saturation;

When the device is an Xbox, the system may consider its property to be game by default, find parameters corresponding to game by reading a preset picture quality database, and recall the parameters. When the device is a set-top box and the vendor of the device is Skyworth, the system may consider its property to be television live by default, find parameters corresponding television live by reading the preset picture quality database, and recall the parameters. The parameters may be classified according to a processing ability of each solution or chip. The parameters may include, but not limited to, a brightness, a contrast ratio, a color saturation, a color temperature, hue, noise reduction and DDC. After the parameters are chosen, a suitable image processing mode is to be chosen. For example, whether a MEMC function needs to be added. The MEMC needs to be enabled if the game is of 120 Hz with fast motion. And whether a colorimetric methed needs to be adjusted (for example, switching from BT.601 to BT.709, switching from BT.709 to BT.2020), but the present disclosure is not limited thereto.

In S130, an image mode for playing current data is configured according to the data parameter and a preset algorithm.

Optionally, the process of configuring the image mode for playing current data according to the data parameter and the preset algorithm is as follows.

It is determined whether the current data is a standard-definition signal or a high-definition signal according to the resolution ratio.

When the current data is the standard-definition signal, the image mode for playing the current data is in a color encoding ITU-R BT.601 format.

When the current data is the high-definition signal, the image mode for playing the current data is in a color encoding ITU-R BT.709 format.

A relationship between the brightness of the standard-definition signal and RGB data and a relationship between color of the standard-definition signal and the RGB data are: Y601=0.299R'+0.587G'+0.114B, Cb=−0.172R'−0.339G'+0.511B'+128 and Cr=0.511R'−0.428G'−0.083B'+128.

A relationship between the brightness of the high-definition signal and the RGB data and a relationship between color of the high-definition signal and the RGB data are: Y709=0.213R'+0.715G'+0.072B', Cb=−0.117R'−0.394G'+0.511B'+128 and Cr=0.511R'−0.464G'−0.047B'+128.

When a digital versatile disc (DVD) is playing a disc, whether the resolution ratio of the current signal is a standard-definition or a high-definition may be determined by reading a total number of lines and a total number of fields. The standard-definition signal adopts ITU-R BT.601 encoding format. The relationship between the brightness of the standard-definition signal and RGB data and the relationship between color of the standard-definition signal and the RGB data are: Y601=0.299R"+0.587G"+0.114W, Cb=−0.172R'−0.339G"+0.511W+128 and Cr=0.511R'−0.428G'−0.083W+128. The high-definition signal adopts ITU-R BT.709 encoding format, and the relationship between the brightness of the high-definition signal and the RGB data and a relationship between color of the high-definition signal and the RGB data are: Y709=0.213R'+0.715G'+0.072B', Cb=−0.117R'−0.394G'+0.511B'+128 and Cr=0.511R'−0.464G'−0.047B'+128. In the related art, when a display device recognizes that an input format of the HDMI is 1080i, the display device displays images in a color encoding ITU-R BT.709 format. The signal that is actually inputted to the HDMI is the standard-definition and is scaled up to 1080i, the signal is correctly displayed only in a color encoding ITU-R BT.601 format, and the color effect after conversion is more realistic.

Optionally, the process of configuring the image mode for playing current data according to the data parameter and the preset algorithm is as follows.

A image content of the current data is inputted to a high-pass filter, a band-pass filter and a low-pass filter.

A gain factor is determined according to a mapping relationship between a mean brightness and a preset brightness threshold in the data parameter.

A compensation data High Pass_Counter is acquired according to the gain factor and a pixel number cumulatively outputted by the high-pass filter.

A proportion is determined according to the compensation data High Pass_Counter, a pixel number BandPass_Counter cumulatively outputted by the band-pass filter and a pixel number LowPass_Counter cumulatively outputted by the low-pass filter.

Whether the image content of the current data is a high bandwidth or a low bandwidth is determined according to a relationship between the proportion and a preset proportion threshold.

When the image content of the current data is determined to be a high bandwidth, the image mode for playing the current data is configured to a high bandwidth image mode.

When the image content of the current data is determined to be a low bandwidth, the image mode for playing the current data is configured to a low bandwidth image mode.

Optionally, when the game device is outputting signals, a utilization condition of the system resource can be estimated by determining a bandwidth of the signals. Inputted image contents are sent into the high-pass filter, the band-pass filter and the low-pass filter. In a non-linear amplification module, three thresholds th1, th2, th3 are configured (for example, 10, 100, 200 are configured to separately represent that a picture is pretty dark, middle-bright or highlight). When a mean brightness of the picture is <=th1, it is indicated that the image is dark on the whole, and the bandwidth of the image is not to be determined. But when th1<the mean brightness of the picture<th2, the gain factor is configured to be gain1, such as 1.5. When th2<=the mean brightness of the picture<th3, the gain factor is configured to be gain2, such as 1.3. When the mean brightness of the picture>=th3, the gain factor is configured to be gain3, such as 1.0. Specific values of the th1, th2, th3 and gain1, gain2, gain3 may be adjusted according to the real situation. The gain factor is generated during this process. The gain factor is multiplied by the pixel number cumulatively outputted by the high-pass filter to obtain the compensation data High Pass_Counter. The pixel number cumulatively outputted by the band-pass filter and the pixel number cumulatively outputted by the low-pass filter are respectively BandPass_Counter and LowPass_Counter. Finally, after compensation, the proportion of the pixel number of the high-pass filter in the overall picture is acquired by the following equation: Ratio=HighPass_Counter/(HighPass_Counter+BandPass_Counter+LowPass_Counter)*100. If the proportion Ratio> HdPrecentValue, such as 10%, the bandwidth of the image content is determined to be a high bandwidth. If the proportion Ratio≤HdPrecentValue, the bandwidth of the image content is determined to be a low bandwidth. When users play games, they focus on the fluency of the games, and therefore, YUV444 may be converted to YUV422 to save bandwidth and guarantee the fluency of the picture.

After all data is processed well, the data can be output. Users may basically acquire the display effect which is relatively matching the displayed contents of the current image. It is unnecessary for users to choose any selections in the television during this process. If users are not quite satisfied with the automatically acquired image effect, the image mode can be adjusted via the previous method to find an effect that users like.

The embodiment of the present application provides a method for configuring the image mode, the current data transmission channel is determined. The matching data parameter is obtained in the database corresponding to the data transmission channel. The data parameter includes one or more of a resolution ratio, a brightness and a color saturation. The image mode for playing current data is configured according to the data parameter and the preset algorithm. First, the system detects and recognizes the signal input device to determine the type of the signal input device. Next, the system determines the contents outputted by the signal input device according to the type of the signal input device. Then, the system automatically obtains matching parameters in the database according to the outputted content of the device, and an image display algorithm is adjusted to match current image contents, so that users can experience a more suitable image effect without adjustment.

Figure 2:
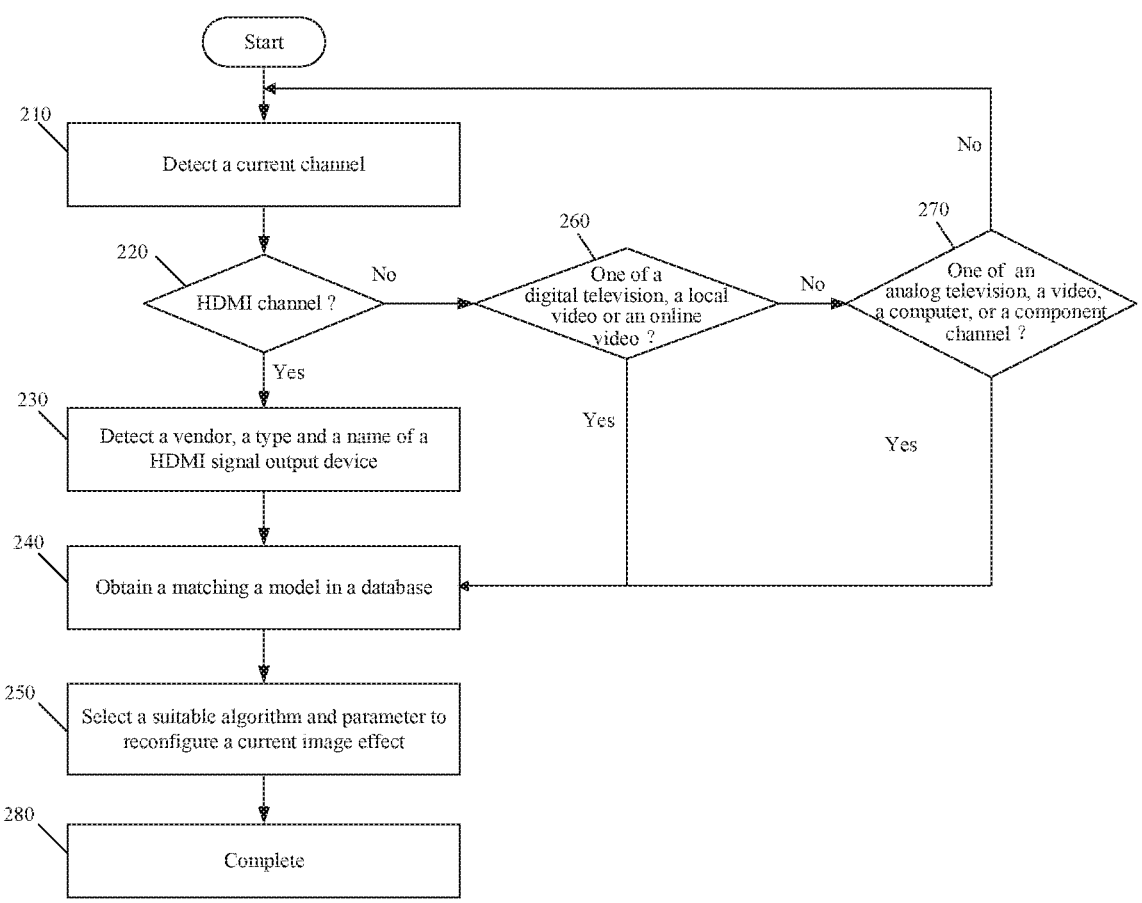
FIG. 2 is another flowchart of a method for configuring an image mode according to an embodiment of the present application.

Referring to FIG. 2, FIG. 2 is another flowchart of a method for configuring an image mode according to an embodiment.

In FIG. 2, the method for configuring the image mode includes:

In S210, after a machine is powered on, a module is initialized and a current channel is determined.

In S220, whether the current channel is a HDMI/MHL channel is determined. If the current channel is the HDMI/MHL channel, the method goes to S230, and if the current channel is not the HDMI/MHL channel, the method goes to S260.

In S230, information such as the vendor and device name of a signal output device is read according to AVI InfoFrame of the HDMI.

In S240, preset image quality parameters are searched according to the information of the signal output device, and the matching ones are chosen.

The formats of signals can be acquired in many ways. For example, formats of Digital Television (DTV) and local (or online) video signals can be acquired by reading code stream information. Formats of other channel signals can be acquired by reading a line-field synchronization, a line-field frequency, etc. The system itself enumerates all supported formats. Each format is correspond to a set of preset parameters. The parameters include some parameters related to image display, such as user adjustable parameters including a brightness, a contrast ratio, a color temperature, noise reduction and the like and user un-adjustable parameters including gamma, DCC and the like. When the system recognizes a signal format, the system searches the enumerated data types for matching ones, and finds corresponding parameters. Default parameters are used if the matching enumerated type cannot be found.

In S250, image parameter are recalled and an image display algorithm is modified.

When the parameter matching is successful, it is theoretically possible to achieve a good display effect. However, this display effect may not be the optimal display effect. For example, a video with a resolution ratio of 480P is converted to 1080P format by a tool and then outputted, televisions recognize that the signal format is 1080P. However, the image actually is 480P, specific contents of the image need to be determined by algorithms, and related optimizing process is operated according to conditions. For another example, for the 1080P signals outputted by HDMI, since the device usages are different, the demands of users for the image quality are also different. Users want to obtain a more realistic visual experience when they are watching High-definition videos and playing games. It is necessary to read and recognize by HDMI protocols and analyze the type of the device belongs. If a read device is a Sony DVD, what is displayed by means of the HDMI is a disc, and if a read device is a X-BOX, what is displayed by means of the HDMI is a game. A Set Top Box and a Network Player can also be determined. After the device type and the display contents are determined, optimization and fine adjustment of the image quality are performed according to the content so as to truly obtain the display effect matching the image contents. The device type is read according to HDMI standard protocols.

In S260, it is determined whether the current channel is a digital television, a local or an online video. If the current channel is a digital television, a local or an online video, the method goes to S240. If the current channel is not a digital television, a local or an online video, the method goes to S270.

In S270, it is determined whether the current channel is an analog television, a video, a computer or a component. If the current channel is an analog television, a video, a computer or a component, the method goes to S240. If the current channel is not an analog television, a video, a computer or a component, the method returns to S210 and determines the type of the channel again.

In S280, a configuration is completed.

Figure 3:
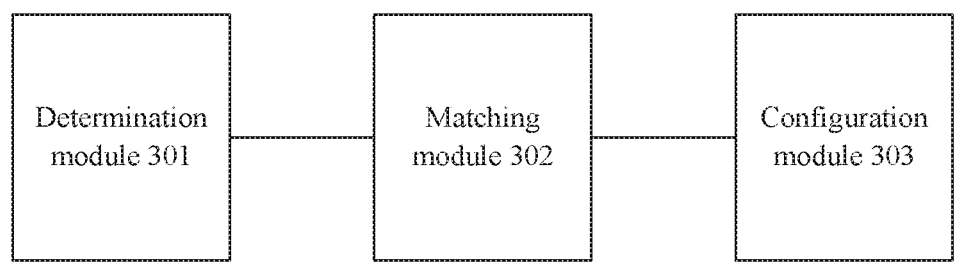
FIG. 3 is a schematic functional module diagram of a device for configuring an image mode according to an embodiment of the present application.

Referring to FIG. 3, FIG. 3 is a schematic functional module diagram of a device for configuring an image mode according to an embodiment.

In FIG. 3, the device for configuring the image mode includes: a determination 302, a matching module 302 and a configuration module 303.

The determination 302 is configured to determine a current data transmission channel.

The data transmission channel is an HDMI/MHL channel, a digital television channel, a local channel, an online video channel, an analog television, a video channel, a computer channel or a component channel.

The matching module 302 is configured to obtain matching data parameter in a database corresponding to the data transmission channel, and the data parameter includes one or more of: a resolution ratio, a brightness and a color saturation The configuration module 303 is configured to configure, according to the data parameter and a preset algorithm, an image mode for playing current data.

Optionally, the configuration module 303 is configured to:

determine, according to the resolution ratio, whether the current data is a standard-definition signal or a high-definition signal.

When the current data is the standard-definition signal, the image mode for playing the current data is in a color encoding ITU-R BT.601 format When the current data is the high-definition signal, the image mode for playing the current data is in a color encoding ITU-R BT.709 format.

The relationship between the brightness of the standard-definition signal and RGB data and the relationship between color of the standard-definition signal and the RGB data are: $Y601=0.299R'+0.587G'+0.114B$, $Cb=-0.172R'-0.339G'+0.511B'+128$ and $Cr=0.511R'-0.428G'-0.083B'+128$;

The relationship between the brightness of the high-definition signal and the RGB data and the relationship between color of the high-definition signal and the RGB data are: $Y709=0.213R'+0.715G'+0.072B'$, $Cb=-0.117R'-0.394G'+0.511B'+128$ and $Cr=0.511R'-0.464G'-0.047B'+128$.

Optionally, the configuration module 303 is configured to:

input an image content of the current data to a high-pass filter, a band-pass filter and a low-pass filter.

determine a gain factor according to a mapping relationship between a mean brightness and a preset brightness threshold in the data parameter.

acquire a compensation data High Pass_Counter according to the gain factor and a pixel number cumulatively outputted by the high-pass filter.

determine a proportion according to the compensation data High Pass_Counter, a pixel number BandPass_Counter cumulatively outputted by the band-pass filter and a pixel number LowPass_Counter cumulatively outputted by the low-pass filter.

determine whether the image content of the current data is a high bandwidth or a low bandwidth according to a relationship between the proportion and a preset proportion threshold.

When the image content of the current data is determined to be a high bandwidth, the image mode for playing the current data is configured to a high bandwidth image mode.

When the image content of the current data is determined to be a low bandwidth, the image mode for playing the current data is configured to a low bandwidth image mode.

The embodiment of the present application provides a device for configuring the image mode. The current data transmission channel is determined. Matching data parameters are obtained in the database corresponding to the data transmission channel. The data parameters include one or more of: a resolution ratio, a brightness and a color saturation. The image mode for playing current data is configured according to the data parameters and the preset algorithm. First, a device type is determined by detecting and recognizing the signal input device by the system. The output content of the device is determined according to the device type. Parameters are automatically matched according to the output content of the device in the database and an image display algorithm is adjusted to match current image contents, so that users can experience a more suitable image effect without adjustment.

The embodiment of the present application further provides a non-transient computer storage medium. The non-transient computer storage medium stores computer-executable instructions to enable the computer to execute the method for configuring the image mode in any one of the above method embodiments.

Figure 4:
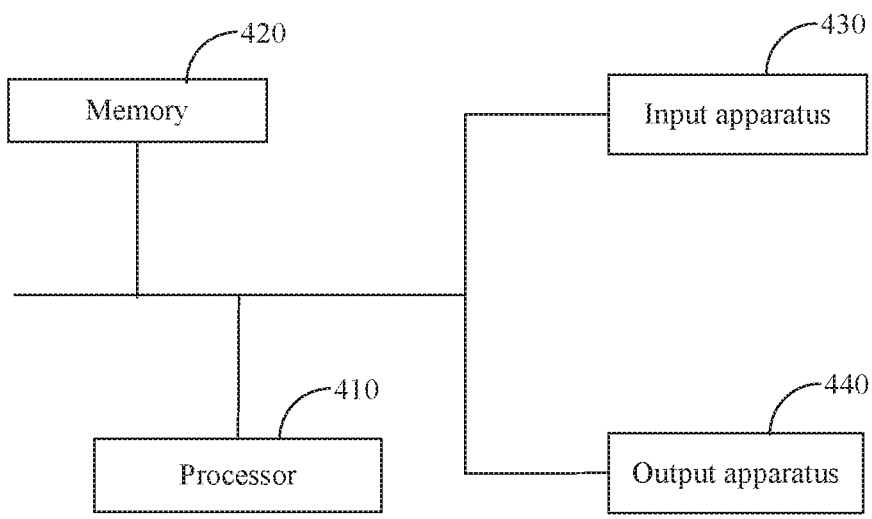
FIG. 4 is a hardware configuration diagram of a device according to an embodiment of the present application.

FIG. 4 is a hardware structural diagram of a device that executes a method for configuring an image mode according to an embodiment. As shown in FIG. 4, the device includes: one or more processors 410 and a memory 420, one processor 410 is exemplified in FIG. 4.

The device that executes the method for configuring the image mode may further includes: an input apparatus 430 and an output apparatus 440.

The processor 410, the memory 420, the input apparatus 430 and the output apparatus 440 may be connected via a bus or other means, as exemplified by a bus connection in FIG. 4.

The memory 420 as a non-transient computer-readable storage medium may be used for storing non-transient software programs, non-transient computer executable programs and modules, for example, program instructions/modules corresponding to the method for configuring the image mode in the embodiment of the present application (for example, the determination module 301, the matching module 302 and the configuration module 303 shown in FIG. 3). By running the non-transient software programs, instructions and modules stored in the memory 420, the processor 410 executes various function applications of a server and processes data, that is, implements.

The memory 420 may include a program storage area and a data storage area. The program storage area may store an operating system and an application program required by at least one function. The data storage area may store data and the like created according to the use of the terminal of for configuring an image mode. Additionally, the memory 420 may include a high-speed random access memory, and may further include a non-transient memory, such as at least one disk memory, a flash memory or other non-transient solid-state memories. In some embodiments, the memory 420 may optionally include memories that are remotely disposed with respect to the processor 420. These remote memories may be connected to the terminal for configuring the image mode by a network.

Examples of such network include, but are not limited to, the Internet, intranets, local area networks, mobile communication networks, and combinations thereof.

The input apparatus 430 can receive inputted digital or character information and generate key signal inputs related to user settings and function control of the terminal for configuring the image mode. The output apparatus 440 may include a display screen or other display devices.

When executed by the one or more processors 420, the one or more modules, which are stored in the memory 420, execute the method for configuring the image mode in any one of the above method embodiments.

The above products can execute the method provided by the embodiment of the present application, and has functional modules and beneficial effects corresponding to the execution method. Technology details that not described in detail in the embodiment can refer to the method provided by the embodiments of the present application.

Finally, it is to be noted that, it will be understood by those of ordinary skill in the art that all or part of the procedure steps in the methods of the above embodiments may be implemented by related hardware instructed by one or more computer programs. These programs may be stored in a computer-readable storage medium, and during the execution of these programs, the procedure steps in the above method embodiments may be implemented. The storage medium may be a magnetic disk, an optical disk, a read-only memory (ROM), a random access memory (RAM), or the like. It is to be noted that the above is only the embodiments of the present application. It will be understood by those skilled in the art that the present application is not limited to the specific embodiments described herein. Those skilled in the art can make various modifications, readjustments and substitutions without departing from the scope of the present application.

The present application is described above in conjunction with embodiments. The description is merely used for explaining the embodiments of the present application, and is not intended to explain in any means as limitations to the present application.

INDUSTRIAL APPLICABILITY

The present application provides a method and device for configuring an image mode. The method includes: determining a device type through detecting and recognizing a signal input device by a system, and then, determining an output content of the signal input device according to the device type, automatically obtaining matching parameters in the database according to the output content of the signal input device, and adjusting the image display algorithm to match current image content, so that users can experience a more suitable image effect without adjustment.

What is claimed is:

1. A method for configuring an image mode, comprising:
    determining a current data transmission channel;
    obtaining a matching data parameter in a database corresponding to the data transmission channel, wherein the data parameter comprises one or more of: a resolution ratio, a brightness and a color saturation; and
    configuring, according to the data parameter and a preset algorithm, an image mode for playing current data, wherein the configuring an image mode for playing current data according to the data parameter and a preset algorithm comprises:
    inputting an image content of the current data to a high-pass filter, a band-pass filter and a low-pass filter respectively;
    determining a gain factor according to a mapping relationship between a mean brightness and a preset brightness threshold in the data parameter;
    acquiring compensation data High Pass_Counter according to the gain factor and a pixel number cumulatively outputted by the high-pass filter;
    determining a proportion according to the compensation data High Pass_Counter, a pixel number BandPass_Counter cumulatively outputted by the band-pass filter and a pixel number LowPass_Counter cumulatively outputted by the low-pass filter; and
    determining, according to a relationship between the proportion and a preset proportion threshold, whether the image content of the current data is a high bandwidth or a low bandwidth in response to determining (i) that the image content of the current data is a high bandwidth, configuring the image mode for playing the current data to be a high bandwidth image mode and (ii) that the image content of the current data is a low bandwidth, configuring the image mode for playing the current data to be a low bandwidth image mode.

2. The method according to claim 1, wherein the data transmission channel is at least one of following channels: a High Definition Multimedia Interface (HDMI)/Mobile High-Definition Link (MHL) channel, a digital television channel, a local channel, an online video channel, an analog television channel, a video channel, a computer channel and a component channel.

3. The method according to claim 1, wherein the configuring an image mode for playing current data according to the data parameter and a preset algorithm comprises:
    determining, according to the resolution ratio, whether the current data is a standard-definition signal or a high-definition signal;
    in response to determining that the current data is the standard-definition signal, configuring the image mode for playing the current data to be a color encoding ITU-R BT.601 format; and
    in response to determining that the current data is the high-definition signal, configuring the image mode for playing the current data to be a color encoding ITU-R BT.709 format.

4. The method according to claim 3, wherein a relationship between the brightness of the standard-definition signal and RGB data and a relationship between color of the standard-definition signal and the RGB data are: Y601=0.299R'+0.587G'+0.114B, Cb=−0.172R'−0.339G'+0.511B'+128 and Cr=0.511R'−0.428G'−0.083B'+128;
    and a relationship between the brightness of the high-definition signal and the RGB data and a relationship between color of the high-definition signal and the RGB data are: Y709=0.213R'+0.715G'+0.072B', Cb=−0.117R'−0.394G'+0.511B'+128 and Cr=0.511R'−0.464G'−0.047B'+128.

5. An electronic device, comprising:
    at least one processor; and
    a memory which is communicatively connected to the at least one processor,
    wherein the memory stores instructions executable by the at least one processor, execution of the instructions by the at least one processor causes the at least one processor to: execute a method for configuring an image mode,
    wherein the method for configuring an image mode comprises:
    determining a current data transmission channel;
    obtaining a matching data parameter in a database corresponding to the data transmission channel, wherein the data parameter comprises one or more of: a resolution ratio, a brightness and a color saturation; and
    configuring, according to the data parameter and a preset algorithm, an image mode for playing current data,
    wherein the configuring an image mode for playing current data according to the data parameter and a preset algorithm comprises:
    inputting an image content of the current data to a high-pass filter, a band-pass filter and a low-pass filter respectively;
    determining a gain factor according to a mapping relationship between a mean brightness and a preset brightness threshold in the data parameter;
    acquiring compensation data High Pass_Counter according to the gain factor and a pixel number cumulatively outputted by the high-pass filter;
    determining a proportion according to the compensation data High Pass_Counter, a pixel number BandPass_Counter cumulatively outputted by the band-pass filter and a pixel number LowPass_Counter cumulatively outputted by the low-pass filter;
    determining, according to a relationship between the proportion and a preset proportion threshold, whether the image content of the current data is a high bandwidth or a low bandwidth;

in response to determining that the image content of the current data is a high bandwidth, configuring the image mode for playing the current data to be a high bandwidth image mode; and in response to determining that the image content of the current data is a low bandwidth, configuring the image mode for playing the current data to be a low bandwidth image mode.

6. The electronic device according to claim 5, wherein the data transmission channel is at least one of following channels: a High Definition Multimedia Interface (HDMI)/Mobile High-Definition Link (MHL) channel, a digital television channel, a local channel, an online video channel, an analog television channel, a video channel, a computer channel and a component channel.

7. The electronic device according to claim 5, wherein the configuring an image mode for playing current data according to the data parameter and a preset algorithm comprises:
determining, according to the resolution ratio, whether the current data is a standard-definition signal or a high-definition signal;
in response to determining that the current data is the standard-definition signal, configuring the image mode for playing the current data to be a color encoding ITU-R BT.601 format; and
in response to determining that the current data is the high-definition signal, configuring the image mode for playing the current data to be a color encoding ITU-R BT.709 format.

8. The electronic device according to claim 7, wherein a relationship between the brightness of the standard-definition signal and RGB data and a relationship between color of the standard-definition signal and the RGB data are: Y601=0.299R'+0.587G'+0.114B, Cb=−0.172R'−0.339G'+0.511B'+128 and Cr=0.511R'−0.428G'−0.083B'+128;
and a relationship between the brightness of the high-definition signal and the RGB data and a relationship between color of the high-definition signal and the RGB data are: Y709=0.213R'+0.715G'+0.072B', Cb=−0.117R'−0.394G'+0.511B'+128 and Cr=0.511R'−0.464G'−0.047B'+128.

9. A non-transient computer-readable storage medium, wherein the non-transient computer-readable storage medium stores computer-executable instructions to enable a computer to execute a method for configuring an image mode,
wherein the method for configuring an image mode comprises:
determining a current data transmission channel;
obtaining a matching data parameter in a database corresponding to the data transmission channel, wherein the data parameter comprises one or more of: a resolution ratio, a brightness and a color saturation; and
configuring, according to the data parameter and a preset algorithm, an image mode for playing current data, wherein the configuring an image mode for playing current data according to the data parameter and a preset algorithm comprises:
inputting an image content of the current data to a high-pass filter, a band-pass filter and a low-pass filter respectively;

determining a gain factor according to a mapping relationship between a mean brightness and a preset brightness threshold in the data parameter;
acquiring compensation data High Pass_Counter according to the gain factor and a pixel number cumulatively outputted by the high-pass filter;
determining a proportion according to the compensation data High Pass_Counter, a pixel number BandPass_Counter cumulatively outputted by the band-pass filter and a pixel number LowPass_Counter cumulatively outputted by the low-pass filter;
determining, according to a relationship between the proportion and a preset proportion threshold, whether the image content of the current data is a high bandwidth or a low bandwidth;
in response to determining that the image content of the current data is a high bandwidth, configuring the image mode for playing the current data to be a high bandwidth image mode; and
in response to determining that the image content of the current data is a low bandwidth, configuring the image mode for playing the current data to be a low bandwidth image mode.

10. The non-transient computer-readable storage medium according to claim 9, wherein the data transmission channel is at least one of following channels: a High Definition Multimedia Interface (HDMI)/Mobile High-Definition Link (MI-IL) channel, a digital television channel, a local channel, an online video channel, an analog television channel, a video channel, a computer channel and a component channel.

11. The non-transient computer-readable storage medium according to claim 9, wherein the configuring an image mode for playing current data according to the data parameter and a preset algorithm comprises:
determining, according to the resolution ratio, whether the current data is a standard-definition signal or a high-definition signal;
in response to determining that the current data is the standard-definition signal, configuring the image mode for playing the current data to be a color encoding ITU-R BT.601 format; and
in response to determining that the current data is the high-definition signal, configuring the image mode for playing the current data to be a color encoding ITU-R BT.709 format.

12. The non-transient computer-readable storage medium according to claim 11, wherein a relationship between the brightness of the standard-definition signal and RGB data and a relationship between color of the standard-definition signal and the RGB data are: Y601=0.299R'+0.587G'+0.114B, Cb=−0.172R'−0.339G'+0.511B'+128 and Cr=0.511R'−0.428G'−0.083B'+128;
and a relationship between the brightness of the high-definition signal and the RGB data and a relationship between color of the high-definition signal and the RGB data are: Y709=0.213R'+0.715G'+0.072B', Cb=−0.117R'−0.394G'+0.511B'+128 and Cr=0.511R'−0.464G'−0.047B'+128.

* * * * *